(12) United States Patent
Brew et al.

(10) Patent No.: US 10,089,165 B2
(45) Date of Patent: Oct. 2, 2018

(54) MONITORING DATA EVENTS USING CALENDARS

(71) Applicant: International Business Machines Corporation, Armonk, NY (US)

(72) Inventors: Anthony T. Brew, Cork (IE); Ian Manning, Cork (IE); Jonathan I. Settle, London (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 15/091,683

(22) Filed: Apr. 6, 2016

(65) Prior Publication Data
US 2017/0293515 A1    Oct. 12, 2017

(51) Int. Cl.
G06F 11/07    (2006.01)
G06F 17/18    (2006.01)

(52) U.S. Cl.
CPC .......... *G06F 11/0781* (2013.01); *G06F 17/18* (2013.01)

(58) Field of Classification Search
CPC ............................. G06F 11/0781; G06F 17/18
USPC ......................................... 702/176, 179, 180
See application file for complete search history.

(56) References Cited

U.S. PATENT DOCUMENTS

| | | | |
|---|---|---|---|
| 7,076,695 B2 * | 7/2006 | McGee | G06F 11/0709 702/179 |
| 7,444,263 B2 | 10/2008 | White et al. | |
| 7,620,523 B2 * | 11/2009 | Marvasti | G05B 23/0221 340/679 |
| 8,538,800 B2 | 9/2013 | Gupta et al. | |
| 9,007,919 B2 | 4/2015 | Ivanyi et al. | |
| 2006/0277087 A1 | 12/2006 | Error | |
| 2012/0209568 A1 * | 8/2012 | Arndt | G06F 11/008 702/183 |
| 2013/0158950 A1 | 6/2013 | Cohen et al. | |
| 2013/0182578 A1 | 7/2013 | Eidelman et al. | |
| 2016/0062950 A1 * | 3/2016 | Brodersen | G06F 17/18 702/181 |

OTHER PUBLICATIONS

V. K. Narayanan, "Anomaly Detection—Using Machine Learning to Detect Abnormalities in Time Series Data", moDATA, Jul. 21, 2015, p. 1-13.

* cited by examiner

*Primary Examiner* — Joseph R Kudirka
(74) *Attorney, Agent, or Firm* — Cantor Colburn LLP; Richard Wilhelm

(57) ABSTRACT

Method for monitoring data events using calendars are provided. Aspects include accessing a plurality of calendars, each calendar defining a schedule of calendar days and receiving a plurality of inputs from one or more applications, each input defining a data event for a specific source, for each calendar of the plurality of calendars. Aspects also include maintaining, for each data event source, a count for each calendar day and a count for each non-calendar day, for each calendar of the plurality of calendars. Aspects further include determining, for each data event source, if a comparison of the count for each calendar day and the count for each non-calendar day is statistically significant, and generating an output for a data event source, if the comparison of the count for each calendar day and the count for each non-calendar day is statistically significant.

15 Claims, 4 Drawing Sheets

MONITORING DATA EVENTS USING CALENDARS

BACKGROUND

The present invention relates to a method, system and computer program product for monitoring data events using multiple calendars.

In many computing systems large amounts of data events are continually monitored and analysed, often for the purpose of determining errors or failures within the system being monitored. For example a telecommunications network such as a 3G or 4G mobile phone network will have very large numbers of components that are continually being monitored by analytical systems. For example there may be millions of subscribers to the networks and many thousands of mobile phone masts which define local cells for connecting to a subscriber's mobile device. Information such as data latency, numbers of subscribers per cell, dropout rates and so on is continually gathered and analysed in order to detect any failures or performance degradation within the overall system. Data events can be something such as a numerical measurement which is being continually monitored for example or could be a discrete event such as a non-working component that has failed, for example.

Data events will often have normal working parameters that are set or generated over time which can be used to determine whether an unusual data event has occurred. For example, in a mobile phone network, connection rates from each cell may be monitored continually with a numerical range set as the normal working parameter for the cell, such as 90% to 98%. When a data event is received that falls outside this range than an alert will be generated that can be considered to be an error state that may need further investigation. So if a data event for a specific cell indicates that the connection rate has fallen to 85%, this can be considered to indicate that the cell is performing sub-optimally, and one or more components within the system are not functioning as they should be.

The problem with such systems is that since the analytical systems monitor a very large number of components, the generation of false positives within the analytical system is a serious drain on resources and can lead to unnecessary responses to otherwise normal working conditions of the components that are being monitored. A change in the operating conditions of one or more components may not be due to any failures within the system being monitored, but if data events are received that appear to be outside the defined normal working conditions, then this will trigger one or more alarms that will then result in actions being taken, that may be unnecessary and will consume resources.

SUMMARY

According to a first aspect of the present invention, there is provided a computer implemented method comprising accessing a plurality of calendars, each calendar defining a schedule of calendar days, receiving a plurality of inputs from one or more applications, each input defining a data event for a specific source, for each calendar of the plurality of calendars, maintaining, for each data event source, a count for each calendar day and a count for each non-calendar day, for each calendar of the plurality of calendars, determining, for each data event source, if a comparison of the count for each calendar day and the count for each non-calendar day is statistically significant, and generating an output for a data event source, if the comparison of the count for each calendar day and the count for each non-calendar day is statistically significant.

According to a second aspect of the present invention, there is provided a system comprising a processor arranged to access a plurality of calendars, each calendar defining a schedule of calendar days, receive a plurality of inputs from one or more applications, each input defining a data event for a specific source, for each calendar of the plurality of calendars, maintain, for each data event source, a count for each calendar day and a count for each non-calendar day, for each calendar of the plurality of calendars, determine, for each data event source, if a comparison of the count for each calendar day and the count for each non-calendar day is statistically significant, and generate an output for a data event source, if the comparison of the count for each calendar day and the count for each non-calendar day is statistically significant.

According to a third aspect of the present invention, there is provided a computer program product for controlling a system, the computer program product comprising a computer readable storage medium having program instructions embodied therewith, the program instructions executable by a processor to cause the processor to access a plurality of calendars, each calendar defining a schedule of calendar days, receive a plurality of inputs from one or more applications, each input defining a data event for a specific source, for each calendar of the plurality of calendars, maintain, for each data event source, a count for each calendar day and a count for each non-calendar day, for each calendar of the plurality of calendars, determine, for each data event source, if a comparison of the count for each calendar day and the count for each non-calendar day is statistically significant, and generate an output for a data event source, if the comparison of the count for each calendar day and the count for each non-calendar day is statistically significant.

BRIEF DESCRIPTION OF THE DRAWINGS

Embodiments of the present invention will now be described, by way of example only, with reference to the following drawings, in which.

DETAILED DESCRIPTION

Figure 1:
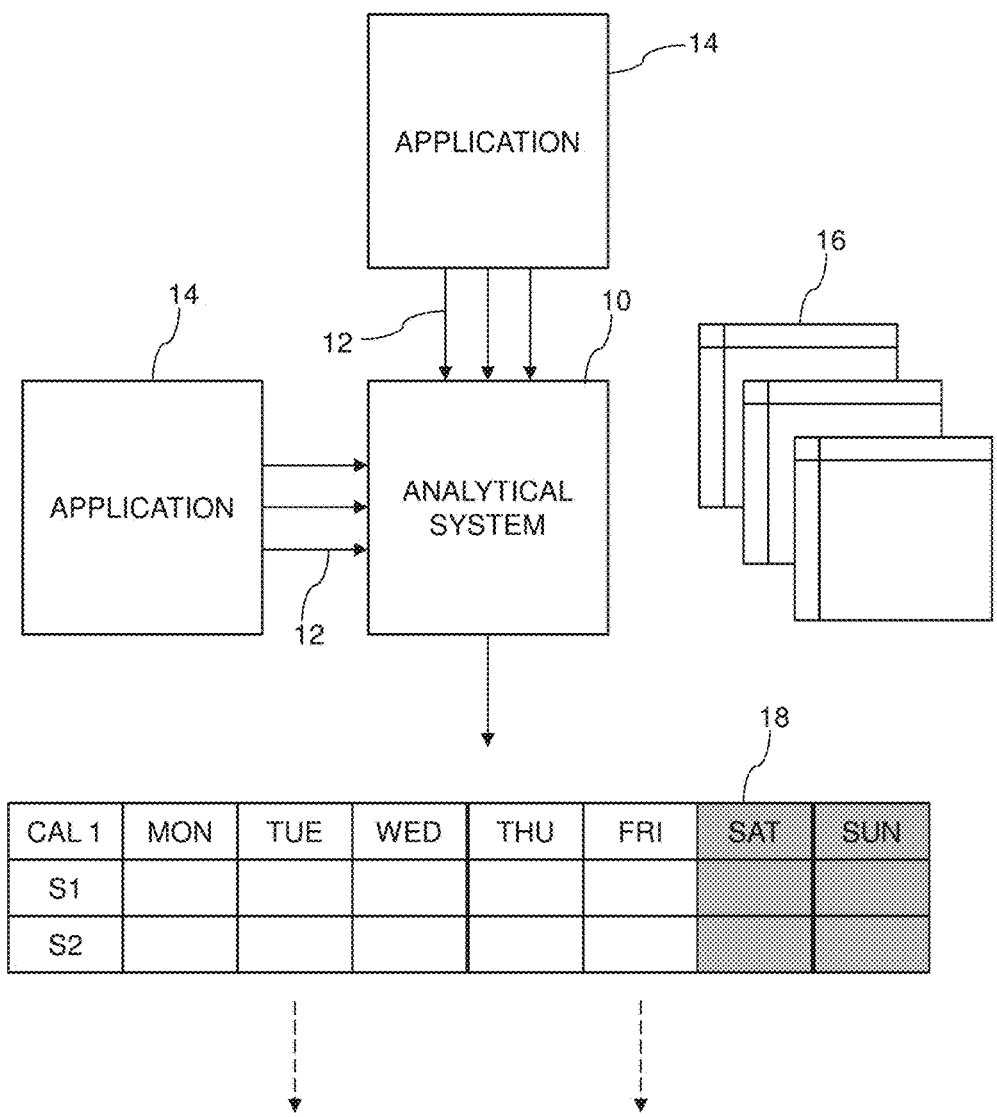
FIG. 1 is a schematic diagram of an analytical system receiving inputs from multiple applications in accordance with an embodiment of the present invention.

In one embodiment, unusual data events can be matched to a calendar in order to better inform how the measured unusual data events can be managed, in light of the determined relationship between the calendar and the unusual data event.

Owing to the invention it is possible to provide a system, method and computer program, that can utilise calendars that define schedules of days, which can determine whether data events are being generated in synchronisation with days in a calendar and take appropriate action with respect to data events that are generated, for example by ignoring the data events when they fall in synchronisation with days in a calendar. For example, a calendar may relate to sporting events, defining a schedule of days that represent home games of a team at a specific stadium. A cell of a wireless telephone network that covers the stadium may see anomalous activity on those days on which the home games are taking place at the stadium, such as an increased connection rate. The analysis process will keep a count of data events for calendar days and non-calendar days and if there is a statistically significant balance between the counts, then the specific calendar can be matched with the relevant source for the data events, here the increased connection rate. This means that subsequently received data events for that source that correspond to the calendar can be ignored, rather than triggering alarm conditions, as would normally occur.

A system and method is provided to automatically associate disparate calendar schedules to changes in performance data represented by data events, which can be used to detect when a Key Performance Indicator (KPI) should exhibit an expected behaviour due to a holiday, or special occasion. If a behaviour can be anticipated, then the behaviour is not anomalous, and in monitoring systems no alert should be raised. Fewer alerts means money saved as each alarm has a cost to investigate. In addition, knowing the components in a system that are associated with an occasion such as a sporting event can help with planning for future occasions and ensure there is sufficient capacity within the system being monitored. Insufficient capacity for a service means that consumers cannot use the service, and money is being lost.

In behavioural learning systems, or systems that calculate a dynamic threshold, the normal behaviour of a KPI is learned over time. The problem is that the learned normal behaviour can be drastically different on holidays, or special times of the year such as Black Friday (a popular shopping day after Thanksgiving in the USA), or because of a system's association with a university (such as spring break and homecoming) or a sporting arena (game/match days). In telecommunications systems, network sites that are located near sporting arenas are subject to drastic changes in volume when a game or match is being played and in addition the sites may not be that easily identifiable as locating physically at the arena, but also ones that would be in use on public transportation and main traffic arteries. Network sites at universities, or even university towns, have changes around homecoming, spring break, and exam periods. In general, a reduction in volume for a network site at a university due to spring break is not actionable and should not be raised as an alarm.

Given the large number of calendars that exist that relate to sport, concerts, universities, schools, civil and national holidays it is likely that a lot of the days of the year could be a special occasion. A statistical technique is required to distinguish mere coincidence from strong statistical likelihood. Maintaining a configuration for all devices and their associated calendars is prone to error, subjective (should public transport be included or not?) and costly. Having to pay a group of people to evaluate which resources (servers, devices and network sites) are impacted by one or more specific days would certainly be time consuming, and would need to be adjusted year to year. For example, in 2015, University of Wisconsin—Oshkosh has a Spring Break from the 23th to the 30th of May, whereas the University of Wisconsin—Lacrosse has Spring Break from the 17th to the 21st of May. So even within the same university there are different calendars to consider. Frequently, during a spring break the normal behaviour for a metric changes dramatically and false/non interesting alerts are presented to an end user such as a network administrator. If the end user is unaware that the problem is related to the spring break then false actions are taken.

Owing to the large number of systems that companies will use it is impractical for someone to have to manually specify the calendar that should apply to every system. To further complicate matters, the system could physically reside in one location, and the data that the system collects could come from a completely different location, or from multiple locations. For example, a company in Singapore may have outsourced some of its technical support operations to a third party in another location, and servers for performing the monitoring are physically resided in the USA. The metrics may all have a USA time zone, but in fact they follow the Singapore working day and holiday calendar. This can result in the wrong calendar being applied to the data. The result would mean increased alerts, which the operators term as "noise", and the inability for an operator to distinguish between what is normal for a period, and what is uniquely anomalous.

Performance metrics and other data events are monitored by an application that detects anomalies, and the metric or the underlying infrastructure that the metric is related to can be commonly related by the monitoring application to a specific physical location, such as country. For example, a set of web servers may be dedicated to respond to user requests from a given country. Some metrics, such as an average response time are impacted by national holidays in the country for which a machine they are attached to serves. This means that on given holiday days, these systems can be under increased/reduced loads and so when historic behaviours are learnt (for example the standard weekly pattern for a metric) in these times thresholds (even dynamically generated ones) can be breached leading to a flood of alarms. Similarly, systems are more prone to failure or to report that they are under non-standard increased/decreased load during holiday periods. These floods of additional events during the holiday season increases the workload on an operator who must decide whether the alarm/event they are observing is due to an actual fault, or because of the change in behaviour from an observed holiday period of the metric/event in question.

A naive solution to this problem is to associate a calendar with each metric that is mediated, or each event that is received. However, in many cases this is simply not possible due to the sheer volume of metrics that are collected, or that a single system may deal with multiple calendars relating to different territories. For example, in relation to a spring break example, a learnt normal range for the metric in question sees a sudden drop off in activity on the network, due to the spring break. When an end user is presented with the issue they need to ask if this of importance, if not why is it being shown and what are the drivers that are causing this change in behaviour. With the method, system and computer program disclosed, in accordance with a embodiment, it is possible to automatically assist the user in understanding this root cause, and so enable faster resolution of such events, or automatic suppression.

The process can associate a weighting or likelihood to a sequence of events as being more closely aligned with a given calendar. This would allow the system to make a decision about whether a different action should be taken around this time. For example, since it is a holiday, and a KPI is lower than normal, this might be to raise an alarm at a lower severity or to not raise an alarm at all. There are two core advantages delivered, firstly a reduced configuration is required and secondly a more accurate analysis of indicators being measured is delivered.

Considerably less system configuration is required to align and detect which calendars are used on given sets of data events. The analytical system can learn over time if a data event in question is impacted by a calendar or not. In a more complex implementation the influence of multiple calendars on a data event can be detected. Learning that a KPI is within a specific calendar means holidays and special occasions are identified and fewer alerts are raised to the operator which results in reduced noise (non-actionable alerts) to operators.

In an embodiment, if the explicit time-zone for a set of data is specified, the system knows where the data is coming from, and knows which calendar to apply. If the data is in UTC (Coordinated Universal Time) and the time-zone information has been lost, the system can attempt to discover it. Each day, a number of alerts are raised by the system. A baseline of the number of alerts per resource can be established, and when a disproportionate number of alerts occur on a day for a given resource, a comparison can be done to see if the alerts match with a calendar schedule. After a low number of observed holidays the system can discover which countries the data is likely coming from, and then on subsequent scheduled days in the calendar an alternate action can be taken, such as do not raise an alert or raise with reduced severity for example. The system uses the observed behaviour of discrete threshold breaches or discrete events to associate a calendar or set of calendars with a resource in question, thereby reducing alarm volumes and helping to identify which resources (such as servers, devices, network sites) are impacted by which calendars.

In an embodiment, the determining, for each data event source, if a comparison of the count for each calendar day and the count for each non-calendar day is statistically significant comprises performing a chi-squared test of the count for each calendar day and the count for each non-calendar day and applying a predetermined threshold to the output of the chi-squared test to determine if the comparison of the count for each calendar day and the count for each non-calendar day is statistically significant. A method of determining whether the spread of data events over calendar days and non-calendar days for a specific source of data events with respect to a specific calendar is actually statistically significant is to use a chi-squared test and then apply a predetermined threshold to the results of the chi-squared test. The result of the chi-squared test is a probability for each count, which can be expressed on a scale of 0 to 1, where 0 would imply that the calendar has no effect on the results for the calendar day and 1 would imply that calendar is determining the results on the calendar day. The threshold applied is one where the result is sure to be statistically significant (for example 0.9), which means that if the result of the chi-squared test for a calendar day is greater than 0.9, then the result is statistically significant and the calendar in question is linked to the data event source in question.

In an embodiment, the method further comprises determining that a rate of data events received from a specific data event source is below a predetermined event rate and transmitting a request to the specific data event source to increase the rate of data events transmitted. The operation of the analytical method requires that sufficient data events are being received from the data event sources. This can be defined in terms of a rate of data events over a predetermined time period, the specifics of which will depend on the component that is generating the data events. For example, if the component is a base station in a wireless telephony network and the metric being measured is the connection rate being above 95%, then an expected output of data events could be one data event per hour (a data event being generated when the connection rate falls below 95%). However, if the analytical system that is performing the analysis of the data events is receiving too few data events to satisfactorily perform a comparison between calendar days and non-calendar days, then the system can transmit a request back to the data event source to increase the rate of data events being generated. In the example of the base station, the connection rate hurdle % could be changed to 90%, so that data events are generated if the connection rate falls below 90%. Although this will temporarily lead to an increase in the number of data events generated and received, it will result in a more robust statistical analysis being carried out on the data available for the calendar days and non-calendar days that are under examination for each of the calendars that are under consideration.

In an embodiment, the method further comprises generating a vector for each data event source, each vector comprising a sum of weighted terms, a first weighted term defining a normal daily contribution of data events for the respective data event source and each subsequent weighted term defining a daily contribution of data events for a respective calendar for the respective data event source. The data events being received can be used to create a complex vector for each data event source. This vector expresses the impact of each calendar on a data event source on a day-to-day basis. All of the calendars are expressed in the vector and the weightings (which add up to 1) define the relative impact that each calendar will have on the data event source. The weights can be adjusted over time as different levels of data events arrive on different calendar and non-calendar days.

In an embodiment, the method further comprises generating a further output if a weight for a term within a specific vector exceeds a predetermined threshold, the further output specifying the data event source to which the vector relates and the respective calendar defined by the term for which the weight exceeds the predetermined threshold. The weights assigned to the terms in a vector are generated as data events are received on different days and refined as more data events are continually received. For example, consider a single data event source X1, which has a doubled level of data events on a specific day D1 that is defined as a calendar day in two different calendars C1 and C2. At this point either or both of the calendars C1 and C2 could be contributing to the increased level of data events received in respect of X1 on D1. On a later day D2, the level of data events received for X1 is increased by 75%. This time the day D2 is defined as a calendar day only within calendar C1 and not within calendar C2. The relative weights for these calendars for data event source X1 can now be defined at 0.75 for C1 and 0.25 for C2 (using a system that has the weights summing to 1). Since a very large number of calendars can be used, it will be appreciated that there will be many overlaps between calendars and the use of vectors and weights can be used effectively to define the relative effects of the different calendars on each of the data event sources. A threshold can be applied to each weight, such at 0.5, which will then generate a further output that defines those calendars that have a material effect on specific data event sources. This provides a methodology that can process a very large number of data events from a large number of data event sources and a very large number of different calendars to produce a set of data event sources that are specifically affected by one or more calendars. This information can be used to adapt the handling of future data events, when they match calendar days defined in calendars that are linked to the specific source of the data events, for example by ignoring the data event or by handling the data event at a reduced urgency than would normally be the case.

FIG. 1 shows, in accordance with a embodiment of the present invention, an analytical system 10 that receives a plurality of inputs 12 from applications 14 (one shown). Each input 12 represents a data event for a specific source of data events. If the source is a base station in a wide area wireless system, then an example of a data event would be the fact that a measured connection rate is outside a predefined normal operating condition. For example, the normal operating condition could be that the connection rate should be above 90% for each one minute interval. If in any one minute period the connection rate falls below 90%, then a data event is generated from an application 14 and this data event is an input 12 into the analytical system 10.

The analytical system 10 has access to a plurality of calendars 16, each calendar 16 defining a schedule of calendar days (and by implication a schedule of non-calendar days). A calendar 16 can be very simple and may define the normal working week with calendar days of Saturday and Sunday. A calendar 16 may define a schedule of days that are religious holidays through the year (some of which may be fixed such as Christmas and some of which may be movable such as Easter in the Christian calendar). A calendar 16 may define days that are highly localised, such as the home games of a sporting team at a specific stadium, or a calendar may define days that are spread over a larger geographic area such as fixtures in a periodic tournament such as the Football World Cup.

For each calendar 16 of the plurality of calendars 16, the analytical system 10 maintains a count (for each data event source) of the data events received on calendar days and on non-calendar days. This is summarised, for a first calendar 16, in a table 18, which here is shown counting data events with respect to a simple calendar 16 that relates to the days of the week, where the two weekend days, Saturday and Sunday have been defined in the schedule of days within the calendar 16 as calendar days. Each row in the table 18 is for a different source S1, S2 etc. of the data events and each column in the table 18 is for a day of the week, showing the non-calendar days (not shaded) and the calendar days (shaded).

Given a plurality of known holiday calendars 16 and a system 10 that is monitoring a plurality of inputs 12 from applications 14 that are known to be effected by at least one of these calendars 16 then information can be built up to handle the data events differently from the normal handling, in light of a connection between a source of data events and a specific calendar 16. The system 10 receives at least one notification/event from a source signalling a non standard deviation of source behaviour. For each calendar 16, the system 10 aligns the received data event to either being known by the calendar 16 or unknown, creating a binned count that is incremented on the arrival of each data event, as represented by the table 18. For each calendar 16, the system 10 is able to report an indication of how likely it is that this calendar 16 is the cause for the non standard behaviour with the presentation of the data event.

Once sufficient data has been collected within the table 18, then the system 10 is able to identify those sources of data events that are affected by a calendar 16. This will be if a comparison of the count for each calendar day and the count for each non-calendar day is statistically significant. There are many different ways in which the statistical significance can be measured. In general, the analytical system 10 will assume that a flat distribution of data events will be the norm. In the example of FIG. 1, each column of the table 18 for a specific source of data events should have a count value that is roughly equal to the other columns, each column being populated with one seventh of the total count across all columns.

The analytical system 10 can apply a statistical test to the values in the columns to see if there is an unexpected weighting towards the columns that represent the calendar days of the specific calendar 16 that is under consideration. This test, in a first embodiment, may be a simple threshold, such as 10% above an expected value, or, in a second embodiment, one or more complicated statistical tests may be used, some of which are discussed in more detail below. If all of the columns that relate to the calendar days for a specific row in the table 18 show the statistical significance required by the test being used, then the data event source represented by that specific row in the table 18 is linked to the calendar 16 under consideration.

Figure 2:
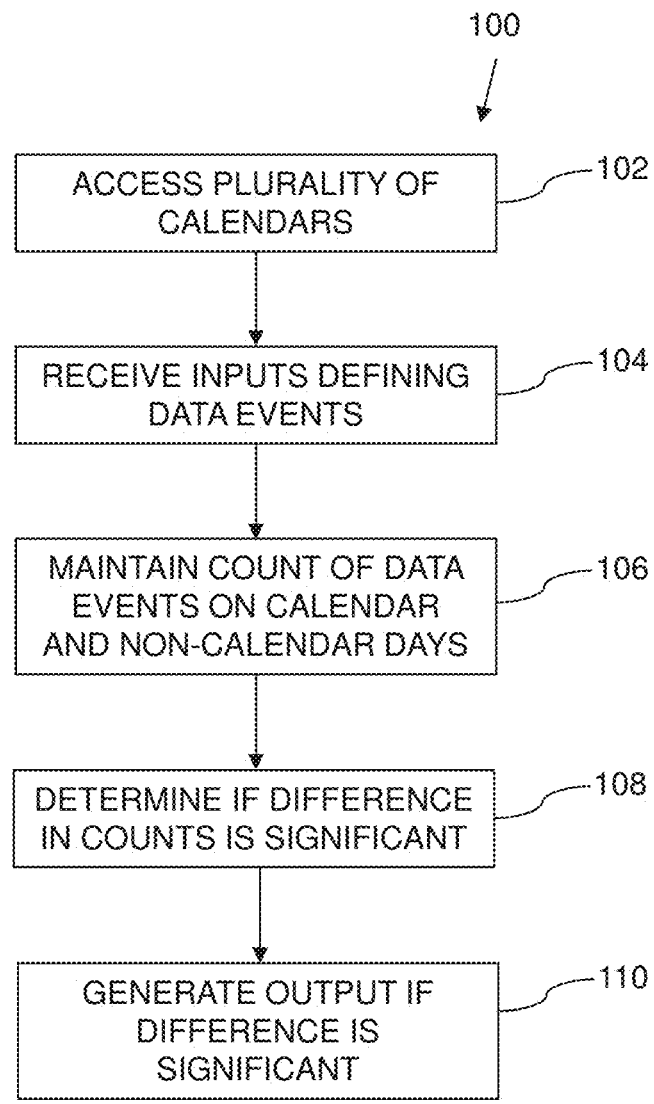
FIG. 2 is a flowchart of a method of operating an analytical system in accordance with a embodiment of the present invention.

FIG. 2 shows, in accordance with an embodiment of the present invention, a flowchart that summarises the methodology carried out by the analytical system 10. The analytical system 10 can be embodied by a server that connects to the applications 14 that are hosted elsewhere, with the server comprising suitable network, processing and storage capabilities. The processor of the server is operated to perform the method 100 shown in FIG. 2. The processor can be controlled by a computer program product on a computer readable medium, with the computer program product comprising a set of instructions that can be executed by the processor of the server. The computer readable medium can be a CD-ROM, for example, with the computer program product stored thereon.

The method 100 includes accessing a plurality of calendars 16, each calendar 16 defining a schedule of calendar days, as shown at block 102. The calendars 16 may be stored by the analytical system 10 directly or may be accessed periodically from a remote location that stores calendars 16, such as a dedicated web service relating to the publication of calendars that are free to access and use. The method 100 also includes receiving a plurality of inputs 12 from one or more applications 14, each input 12 defining a data event for a specific source, as shown at block 104. The data event is generated for the specific source when that source is operating in a non-standard manner. The data event is a numerical metric or a discrete event.

The method 100 also includes, as shown at block 106, maintaining (for each of the calendars 16 of the plurality of calendars 16), for each data event source, a count for each calendar day and a count for each non-calendar day. As discussed above, this can be implemented via a series of table 18, as shown in FIG. 1. Each table 18 represents a different calendar 16 and each row in each table 18 represents a different source of data events. Next, as shown at block 108, the method includes, for each calendar 16 of the plurality of calendars 16, determining, for each data event source, if a comparison of the count for each calendar day and the count for each non-calendar day is statistically significant, and as shown at block 110, the method 100 completes with by generating an output for a data event source, if the comparison of the count for each calendar day and the count for each non-calendar day is statistically significant.

Given a plurality of known holiday calendars 16, the system 10 is monitoring a plurality of inputs 12 from applications 14 that are known to be effected by at least one of the calendars 16. Holiday calendars can be easily obtained from the Internet, for example from the webservice http://www.timeanddate.com/holidays/. Many systems are clearly affected by increased/decreased use due to changes in human population behaviour around the times defined by the schedule of days in calendars. The system 10 is not limited to publically available calendars 16 and can add to the collection of calendars 16 additional purpose built calendars 16 such as for example university calendars.

The system 10 receives at least one notification/event from a connected system (via an application 14) signalling a non standard deviation of system behaviour. Events and notifications from any connected systems come in continually to the applications 14. For each calendar 16, the received data event is aligned to either being known by the calendar or unknown, creating a binned count that is incremented on the arrival of each event. As above, this can be implemented via a table 18. If the set of calendars is C={c_0, . . . , c_n} and for each calendar c_i, the analytical system 10 keeps a total of counts_c_i={events/notifications that occurred on a non-calendar day, events/notifications that occurred on a calendar day}. The system 10 also knows the expected split of the calendar counts_expected_ci={count of calendar days, counts of non-calendar days}.

For each calendar 16 that is under consideration, the system 10 reports back an indication of how likely it is that this calendar 16 is the cause for the non standard behaviour with the presentation of the notification/event. For each calendar 16 and the counts there are several statistical tests (described below) that can associate a weight for the calendar 16, to the observed occurrences of the event/notification that the system 10 is currently considering. Two that can be used are a chi-squared test on the proportions observed for each calendar and the expected uniform proportion (i.e. the calendar 16 has no effect), or an alternative could be to use a distance metric such as Euclidean distance, city block distance, cosine similarity between the actual split and the expected split to provide a ranking. A more complex embodiment would be to explain the counts as a "mixture" of calendars proportions where as outlined below the solution to the most likely calendar 16 could be found using gradient descent.

The system 10 must employ a statistical test to ascertain whether the different counts between the calendar days and the non-calendar days are statistically significant or not. One way in which this can be achieved is through the use of a chi-squared test approach, which is a statistical test of proportions (see https://en.wikipedia.org/wiki/Chi-squared_test for example). This test can be understood with respect to a gambler with a six-sided die that is loaded to more frequently roll a six. When the gambler has rolled his die 60 times, the proportion of expected (on average) events should be 10 of each number if the die was not loaded. However the observed pattern may be: {5 ones, 3 twos, 6 threes, 4 fours, 7 fives, 35 sixes}. From this result it is possible to calculate a p-value that the die rolls were not drawn from a fair uniform distribution using a chi-squared statistical proportion test. The null hypothesis that the dice is drawn from a uniform distribution can be rejected. It is possible to now test the suspicion that that the die roll is biased towards a single number, from the actual result generated. By running the chi-squared test, it would be possible to find a stronger weighting towards the die being drawn from distribution 6, and this would lead to the conclusion that the die is favoured in rolling 6s.

This methodology can be applied to calendar detection. When performing a comparison of the count for each calendar day and the count for each non-calendar day, the test for statistical significance can be a chi-squared test of the count for each calendar day and the count for each non-calendar day, then applying a predetermined threshold to the output of the chi-squared test. When a data event occurs, the data event either occurs on a special day calendar day from a pre-described set of calendars, or does not. The system 10 can then define a likelihood distribution (similar to the loaded die analogy discussed above) for each known calendar 16, for example a calendar called "Ireland" may have a distribution as follows: {normal_day_1:(9/365), holiday_day_1:(1/365), holiday_day_2:(1/365), . . . , holiday_9:(1/365)}, where the counters are incremented as the system encounters new bank holidays from the start of the learning interval. This distribution represents the expected number of alarms that should be observed in Ireland if the events being observed are not impacted by the Irish vacation schedule. By applying the chi-squared statistical analysis, the system 10 can associate a p-value that the data event is affected by differing event rates on Irish holidays. P-Values can be calculated for all calendars 16 known to the system 10 (such as those for state holidays in US, UK, France and so on), and the calendar that obtains the highest value (and exceeds) a predetermined threshold (of say 0.999) can be selected as the calendar 16 most likely to be associated with the data event source, where the calendar that affects the metric will generate the highest response.

From this methodology, it can be seen that the counts for calendar days and non-calendar days for a specific calendar can be tested using a chi-squared analysis to determine if the results of the count are statistically significant. Once a calendar 16 is considered to be relevant to the source of the data events, then an output is generated by the system 10. This output may be to notify a systems administrator specifically about the link between the calendar 16 and the source of the data events, or the system 10 may use the output to maintain a database of data event sources and their connected calendars, in order to adapt future behaviours in respect of further data events from the source.

Figure 3:
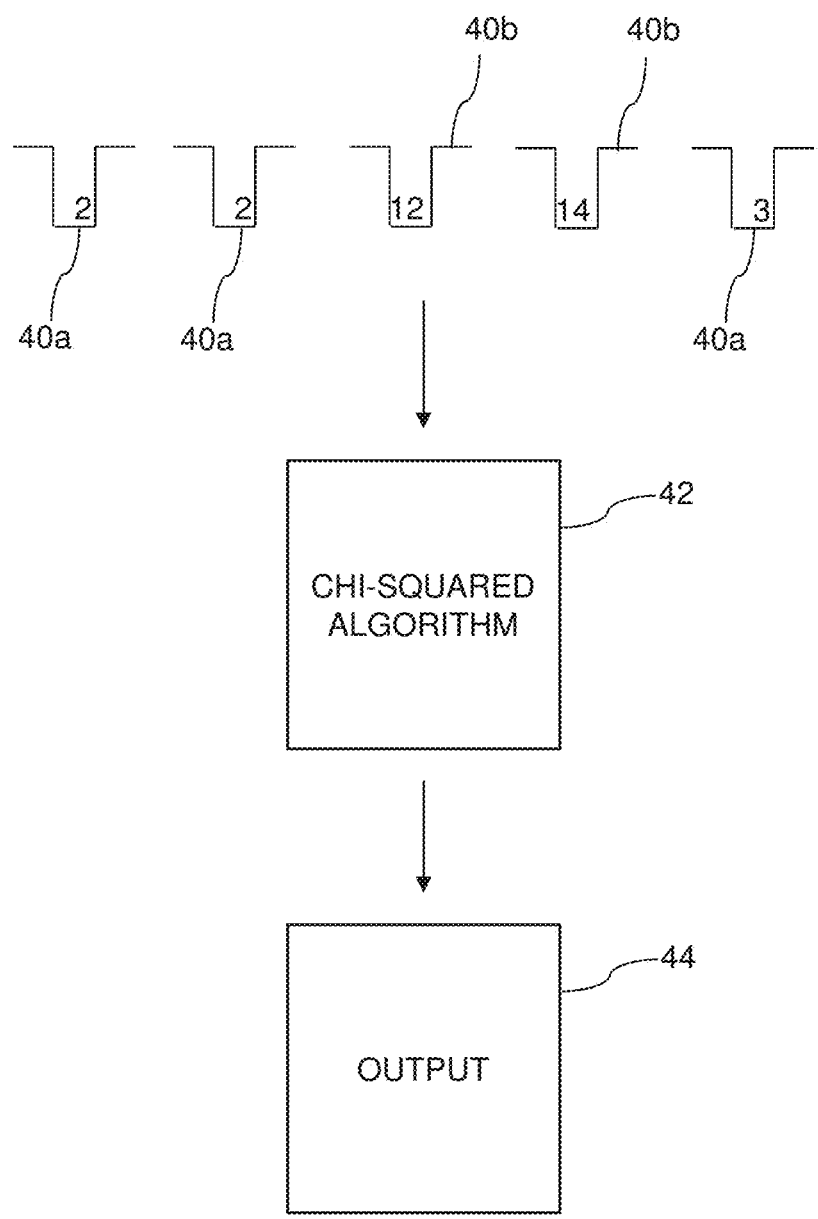
FIG. 3 shows, in accordance with an embodiment of the present invention, a schematic diagram of series of counts of data events on consecutive days.

FIG. 3 illustrates, in accordance with a embodiment of the present invention, a series of counts 40 that are for a single data event source in relation to single calendar, where each count 40 represents a total of the data events received on a given day, counts 40*a* relating to non-calendar days and the counts 40*b* relating to calendar days. The values of the different counts 40 are analysed using a chi-squared algorithm 42, which will assign a probability p to the calendar days being statistically significant. If the probability p is above a threshold level, then an output 44 is generated that can be used either to inform a user about the relationship between the data event source and the calendar in question or can be used to modify system behaviour in future with respect to further calendar days for the data event source in question.

In a further embodiment, the system 10 can be operated to use more complex statistical schemes for example using gradient descent and/or a mixture or calendars to provide an output. Each day of a week in a normally operating system should generate the same number of data events from a data event source. The data events received from a data event source can be expressed as a vector. A baseline system would expect the distribution of events to be evenly spread across the entire year, though this vector can be expanded out further. As the system 10 observes days, the system 10 adds a count to an "expected_observation" vector proportions for standard days, containing the proportion of event that are expected to be seen: {day_1: 1/n, day_2: 1/n, ..., day_n(current):1/n}

Similarly for each calendar 16, the system 10 adds a day for each observation. An "expected_calendar_uk" vector would be (where p is the number of holiday days in the calendar): {day_1: 0, day_2: 0, ..., day_holiday_1: 1/p, ..., day_holiday_p: 1/p}

The system builds such an expected proportion vector for each calendar 16 that the system 10 believe may interact with any of the sources of the data events. The system 10 has an actual observed number of alarms from the data that is being received, via the data events. This can be expressed as an "actual_observation" vector: {day_1: observation_count_1, ..., day_n: observation_count_n}

The actual observation distributed vector is drawn from a mixture of the "expected_observation" vector and each of the calendar vectors known by the system 10. This vector can be expressed as an actual_proportion vector: (weight_1*expected observation vector)+(weight_2*expected_calendar_uk)+ ... +(weight_k*expected_calendar_k)+error_term The weights learnt attribute the contribution of each calendar to the "actual_observation" vector. This final vector is a vector for a specific data event source that comprises a sum of weighted terms, a first weighted term defining a normal contribution of data events for the respective data event source and each subsequent weighted term defining a daily contribution of data events for a respective calendar for the respective data event source. Each of the terms in the final vector are defined on a per day basis, from day 1 to day n, the current day.

The problem of finding appropriate weights that minimize the error term is calculated by linear optimization methods such as gradient descent, or non-deterministic methods such a simulated annealing or genetic algorithms. The weights are constrained such that weights sum to 1. If a weight for a given calendar 16 contributes more than a given percentage, then this metric could be deemed to be influenced by the calendar 16 in question. This solution allows for more than one calendar 16 to be associated with the data event rate in question. Therefore if a weight for a term within a specific vector exceeds a predetermined threshold (preferably 0.5) then a further output is generated specifying the data event source to which the vector relates and the respective calendar defined by the term for which the weight exceeds the predetermined threshold.

Further possible improvements to the methodology described above can be implemented. For example, if the rate of data events being generated by the data event source is not high enough to complete an actual statistical analysis, the threshold for alarms could be lowered (since, for example, metric systems generate alarms when their statistically normalized score exceeds a given threshold) to provide more data events and increase the confidence of the methods outlined above. In this case, the rate of data events received from a specific data event source is determined to be below a predetermined event rate and there is transmitted back to the data event source a request to increase the rate of data events transmitted from the data event source to the analytical system 10.

Figure 4:
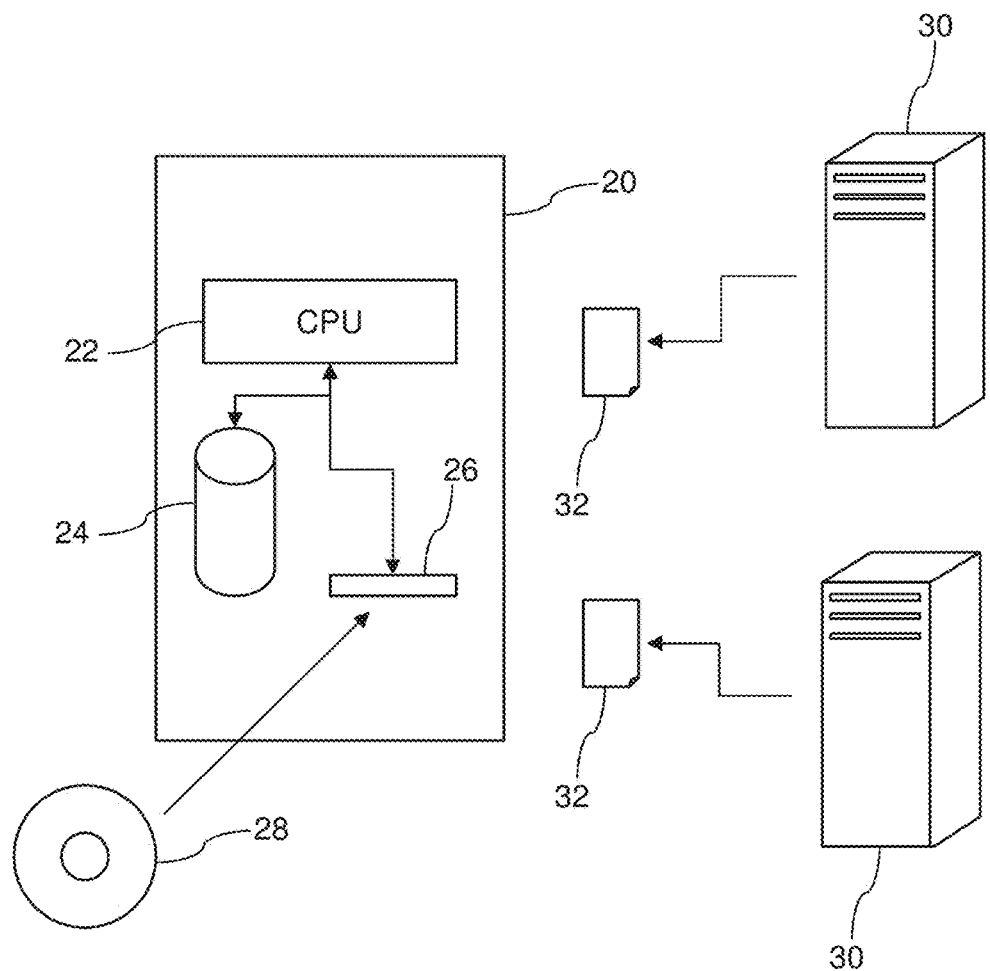
FIG. 4 shows, in accordance with an embodiment of the present invention, a schematic diagram of a server system.

FIG. 4 shows, in accordance with a embodiment of the present invention, schematically a server 20, which comprises a processor 22, a storage device 24 and a local disk interface 26. The processor 22 is connected to the storage device 24 and to the local disk interface 26. A computer program product is provided on a computer readable medium 28, which is a CD-ROM 28. The computer program product comprises instructions that can be executed by the processor 22 in order to control the operation of the processor 22. The server system 20 is shown in this Figure as a single physical component, but the functions provided by the server 20 could be provided by a series of connected, but distributed, components.

Also shown in this Figure are multiple sources 30 of data events 32. The sources 30 are connected directly or indirectly to the server 20, for example over a wide area network such as the Internet. The sources 30 of data events 32 could be physically located anywhere in the world and may all be part of the same system, such as a telecommunications network, or could be part of numerous individual different systems. The server 20 is running the analytical system 10 shown in FIG. 1 on its processor 22. The applications 14 that provide the inputs 12 to the analytical system 10 may also be located on the server 20 or may be located on other intermediate devices, more closely connected to the sources 30 of data events 32.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method comprising:
accessing a plurality of calendars, each calendar defining a schedule of calendar days,
monitoring components of a cellular network to obtain a plurality of inputs from one or more applications running on the components of the cellular network, each input defining a data event for a specific source, wherein the data event indicates that the specific source has an operating condition outside of a predefined range,
for each calendar of the plurality of calendars, maintaining, for each data event source, a count for each calendar day and a count for each non-calendar day,
for each calendar of the plurality of calendars, determining, for each data event source, if a comparison of the count for each calendar day and the count for each non-calendar day is statistically significant,
transmitting the plurality of inputs to indicate an abnormal operating condition of the specific source; and
based on a determination that the comparison of the count for each calendar day and the count for each non-calendar day is statistically significant, generating an output for a data event source, wherein the output for the data event source indicates a link between the data event source and the calendar day and suppressing the transmission of the plurality of inputs.

2. A method according to claim 1, wherein the determining, for each data event source, if the comparison of the count for each calendar day and the count for each non-calendar day is statistically significant comprises performing a chi-squared test of the count for each calendar day and the count for each non-calendar day and applying a predetermined threshold to an output of the chi-squared test to determine if the comparison of the count for each calendar day and the count for each non-calendar day is statistically significant.

3. A method according to claim 1, further comprising determining that a rate of data events received from a specific data event source is below a predetermined event rate and transmitting a request to the specific data event source to increase the rate of data events transmitted.

4. A method according to claim 1, further comprising generating a vector for each data event source, each vector comprising a sum of weighted terms, a first weighted term defining a normal daily contribution of data events for a respective data event source and each subsequent weighted term defining a daily contribution of data events for a respective calendar for the respective data event source.

5. A method according to claim 4, further comprising generating a further output if a weight for a term within a specific vector exceeds a predetermined threshold, the further output specifying the data event source to which the specific vector relates and a respective calendar defined by the term for which the weight exceeds the predetermined threshold.

6. A system comprising a processor arranged to:
- access a plurality of calendars, each calendar defining a schedule of calendar days,
- monitor components of a cellular network to obtain a plurality of inputs from one or more applications running on the components of the cellular network, each input defining a data event for a specific source, wherein the data event indicates that the specific source has an operating condition outside of a predefined range,
- for each calendar of the plurality of calendars, maintain, for each data event source, a count for each calendar day and a count for each non-calendar day,
- for each calendar of the plurality of calendars, determine, for each data event source, if a comparison of the count for each calendar day and the count for each non-calendar day is statistically significant,
- transmit the plurality of inputs to indicate an abnormal operating condition of the specific source; and
- based on a determination that the comparison of the count for each calendar day and the count for each non-calendar day is statistically significant, generate an output for a data event source, wherein the output for the data event source indicates a link between the data event source and the calendar day and suppress the transmission of the plurality of inputs.

7. A system according to claim 6, wherein the processor is arranged, when determining, for each data event source, if the comparison of the count for each calendar day and the count for each non-calendar day is statistically significant, to perform a chi-squared test of the count for each calendar day and the count for each non-calendar day and applying a predetermined threshold to an output of the chi-squared test to determine if the comparison of the count for each calendar day and the count for each non-calendar day is statistically significant.

8. A system according to claim 6, wherein the processor is further arranged to determine that a rate of data events received from a specific data event source is below a predetermined event rate and transmit a request to the specific data event source to increase the rate of data events transmitted.

9. A system according to claim 6, wherein the processor is further arranged to generate a vector for each data event source, each vector comprising a sum of weighted terms, a first weighted term defining a normal daily contribution of data events for a respective data event source and each subsequent weighted term defining a daily contribution of data events for a respective calendar for the respective data event source.

10. A system according to claim 9, wherein the processor is further arranged to generate a further output if a weight for a term within a specific vector exceeds a predetermined threshold, the further output specifying the data event source to which the specific vector relates and a respective calendar defined by the term for which the weight exceeds the predetermined threshold.

11. A computer program product for controlling a system, the computer program product comprising a computer readable storage medium having program instructions embodied therewith, the program instructions executable by a processor to cause the processor to:
- access a plurality of calendars, each calendar defining a schedule of calendar days,
- monitor components of a cellular network to obtain a plurality of inputs from one or more applications running on the components of the cellular network, each input defining a data event for a specific source, wherein the data event indicates that the specific source has an operating condition outside of a predefined range,
- for each calendar of the plurality of calendars, maintain, for each data event source, a count for each calendar day and a count for each non-calendar day,
- for each calendar of the plurality of calendars, determine, for each data event source, if a comparison of the count for each calendar day and the count for each non-calendar day is statistically significant,
- transmit the plurality of inputs to indicate an abnormal operating condition of the specific source; and
- based on a determination that the comparison of the count for each calendar day and the count for each non-calendar day is statistically significant, generate an output for a data event source, wherein the output for the data event source indicates a link between the data event source and the calendar day and suppress the transmission of the plurality of inputs.

12. A computer program product according to claim 11, wherein the instructions for determining, for each data event source, if a comparison of the count for each calendar day and the count for each non-calendar day is statistically significant comprises instructions for performing a chi-squared test of the count for each calendar day and the count for each non-calendar day and applying a predetermined threshold to the output of the chi-squared test to determine if the comparison of the count for each calendar day and the count for each non-calendar day is statistically significant.

13. A computer program product according to claim 11, further comprising instructions for determining that a rate of data events received from a specific data event source is below a predetermined event rate and transmitting a request to the specific data event source to increase the rate of data events transmitted.

14. A computer program product according to claim 11, further comprising instructions for generating a vector for each data event source, each vector comprising a sum of weighted terms, a first weighted term defining a normal daily contribution of data events for a respective data event source and each subsequent weighted term defining a daily contribution of data events for a respective calendar for a respective data event source.

15. A computer program product according to claim 14, further comprising instructions for generating a further output if a weight for a term within a specific vector exceeds a predetermined threshold, the further output specifying the data event source to which the specific vector relates and a respective calendar defined by the term for which the weight exceeds the predetermined threshold.

* * * * *